United States Patent [19]

Kamejima et al.

[11] Patent Number: 4,799,267
[45] Date of Patent: Jan. 17, 1989

[54] IMAGE PROCESSING APPARATUS AND PROCESSING METHOD

[75] Inventors: Kohji Kamejima, Chiyoda; Yoshiyuki Nakano, Hitachi; Masakatsu Fujie, Ushiku; Taro Iwamoto, Mito; Hiroshi Yamamoto, Chiyoda, all of Japan

[73] Assignee: Hitachi, Ltd., Tokyo, Japan

[21] Appl. No.: 946,007

[22] Filed: Dec. 24, 1986

Related U.S. Application Data

[63] Continuation of Ser. No. 536,874, Sep. 29, 1983, abandoned.

[30] Foreign Application Priority Data

Oct. 22, 1982 [JP] Japan ................................ 57-184537

[51] Int. Cl.$^4$ ............................................. G06K 9/00
[52] U.S. Cl. ......................................... 382/1; 382/15; 382/22; 382/37; 901/47
[58] Field of Search ............... 318/570, 574, 580, 587; 244/3.17; 358/103; 382/1, 15, 16, 22, 25, 28, 30, 31, 34, 37–40; 901/1, 47; 364/449, 456, 457, 460

[56] References Cited

U.S. PATENT DOCUMENTS

| 3,459,392 | 8/1969 | Buynak et al. ............... 244/3.17 |
|---|---|---|
| 3,638,188 | 1/1972 | Pincoffs et al. ............... 382/14 |
| 4,017,985 | 4/1977 | Heartz ........................... 35/10.4 |
| 4,119,900 | 10/1978 | Kremenitz ..................... 901/1 |
| 4,179,693 | 12/1979 | Evans et al. ................. 343/5 MM |
| 4,294,544 | 10/1981 | Altschuler et al. ............ 901/47 |
| 4,449,123 | 5/1984 | Muragana ..................... 340/784 |
| 4,451,929 | 5/1984 | Yoshida ........................ 382/15 |
| 4,489,389 | 12/1984 | Beckwith et al. ............. 358/103 |
| 4,514,733 | 4/1985 | Schhidtlein et al. .......... 343/5 MM |
| 4,628,453 | 12/1986 | Kamejima et al. ............ 364/424 |

FOREIGN PATENT DOCUMENTS 2091526 7/1982 United Kingdom .

OTHER PUBLICATIONS

"Newt: a Mobile Cognitive Robot", Ralph Hollis, Oct. 1983.

Primary Examiner—Leo H. Boudreau
Assistant Examiner—Jose L. Couso
Attorney, Agent, or Firm—Antonelli, Terry & Wands

[57] ABSTRACT

In processing topographical information necessary for the traveling of a robot or the like furnished with an automatic traveling function; topography is predicted from the topographical information previously given, so as to prepare a predictive image, a difference image between the predictive image and an actual image caught by a television camera installed on the robot or the like is obtained, and the obtained result if used for correcting the topographical information previously given.

9 Claims, 5 Drawing Sheets

IMAGE PROCESSING APPARATUS AND PROCESSING METHOD

This application is a continuation of U.S. application Ser. No. 536,874, filed Sept. 29, 1983, now abandoned.

BACKGROUND OF THE INVENTION

The present invention relates to an image processing apparatus and a processing method which can efficiently correct and collect topographical information. More particularly, it relates to an image processing apparatus and processing method which are well-suited to provide topographical information to vehicles or robots having an automatic traveling function.

A map which indicates topographical information, namely, the arrangement of roads, buildings, obstacles, etc. is indispensible to a traveling type robot. In a conventional traveling type robot, input images in the form of topographical information have been handled independently for respective frames of data. In, for example, a system having a plurality of photographing devices, the outputs of the respective photographing devices have been stored in independent memory devices, and images inputted in time series have also been stored in respectively separate memory devices.

With such a storage method, however, the information is overlappingly stored, and hence, a large storage capacity is required. This has resulted in the disadvantage that, in determining the action to be taken by the traveling type robot, a considerable effort is required for extracting essential information.

SUMMARY OF THE INVENTION

The present invention has for its object to provide an image processing apparatus and processing method which can prepare a correct map by revising a previously given map on the basis of topographical information delivered from an image input device in time series with the traveling of an automatic traveling object, such as a robot.

In one aspect of performance of the present invention, an image processing apparatus comprises storage means for storing data representing a previously given map, calculation means for preparing a predictive topographical image on the basis of the data, means for inputting actual image information successively during the traveling of an automatic traveling object, means for comparing the predictive image with the actual image, and correction means for updating the map data within the storage means on the basis of the comparison result.

In another aspect of performance of the present invention, an image processing method comprises a first step of reading out map data from storage means, a second step of predicting an output of an image input means and calculating a predictive image on the basis of the map data, a third step of comparing an input image delivered from the image input means and the predictive image so as to obtain a difference image, and a fourth step of updating the map data of the storage means on the basis of the difference image.

DETAILED DESCRIPTION OF THE INVENTION

Figure 1:
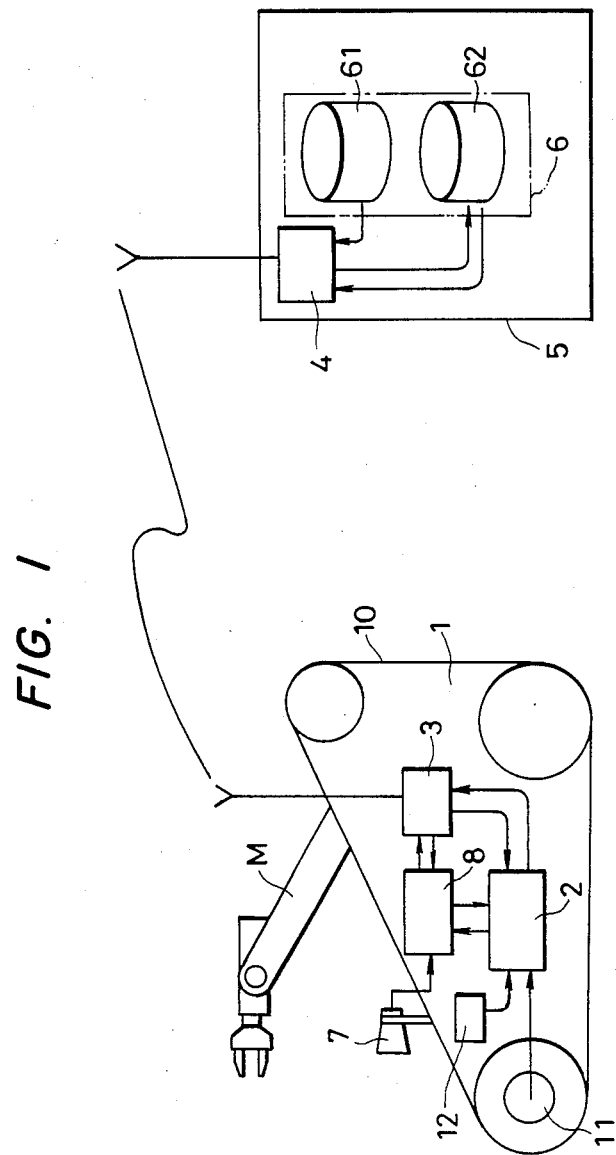
FIG. 1 is a block diagram showing an example of a traveling robot control system which employs an image processing apparatus according to the present invention.

FIG. 1 is a block diagram showing an example of a traveling robot system to which the present invention is applied. Referring to the figure, numeral 1 designates a traveling robot which is equipped with a crawler 10 and a manipulator M driven by respective motors. The detailed construction of such a robot is disclosed in U.S. patent application Ser. No. 476,271 by way of example.

The control circuit 2 of the robot 1 is connected to the storage device 6 of a control station 5 through transmitter-receivers 3, 4. The storage device 6 includes a general building file 61 and an individual building file 62. Upon receiving a radio signal from the control station 5, the control circuit 2 controls the operation of the robot 1. The robot 1 includes an image input device 7, such as television camera, the output of which is applied to an image processor 8. Information on the actual traveling direction and velocity of the robot 1 are sent from an encoder 11 and a gyroscope 12 to the control circuit 2, and are used for the control of the robot 1 and for image correction, as will be described in more detail hereinafter.

Figure 2:
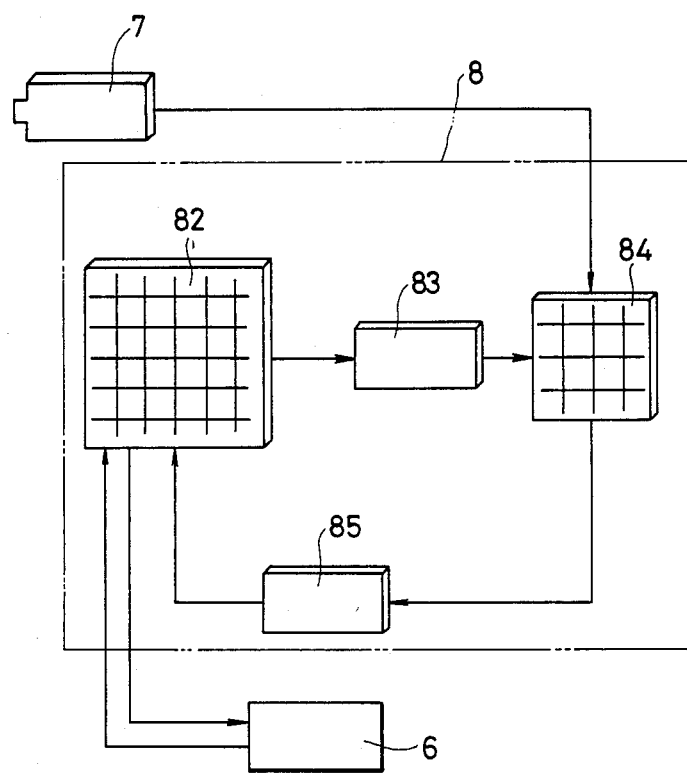
FIG. 2 is a diagram showing an embodiment of the image processing apparatus of the present invention.

FIG. 2 is a block diagram showing an embodiment of the image processor 8 in FIG. 1. Referring to FIG. 2, the image processor 8 includes a main memory 82 for storing map data, an arithmetic unit 83 which calculates a predictive image from the map data received from the main memory 82, an auxiliary memory 84 which stores the difference between an input image received from the image input device 7 and the predictive image calculated by the arithmetic unit 83, and a correction unit 85 which updates the content of the main memory 82 on the basis of the difference signal stored in the auxiliary memory 84. The image input device 7 is placed on the traveling robot, and is manipulated by another manipulation means.

Figure 3:
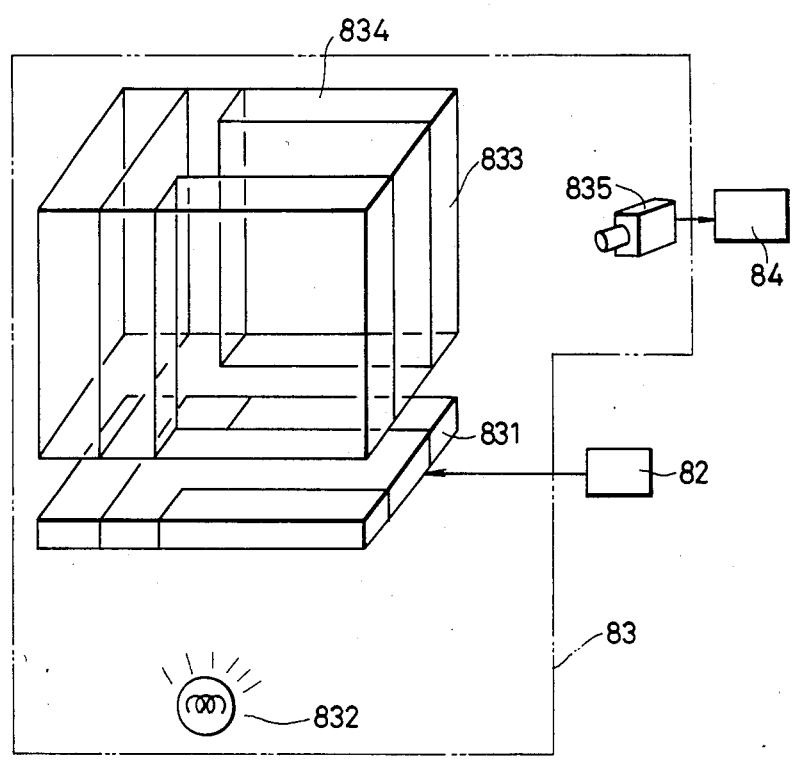
FIG. 3A is a diagram of the image memory.
FIG. 3B is a flow diagram of processing of data from the image memory to produce the predictive image.

A map is stored in the main memory 82. In accordance with the present invention, the expression "map" signifies data providing information as to the positions, sizes, shapes etc. of roads, buildings, obstacles, etc. existing around the robot. More specifically, a member which employs storage elements arrayed in, e.g., two dimensions, and in which the data of the items, sizes, shapes etc. of roads, buildings, obstacles etc. are written in the arrayed elements shall be called the "map". In other words, the content of the main memory 82 expresses the surroundings of the robot in the form of electric signals. For example, as seen in FIG. 3A, the image memory may be implemented by an array of storage cells Im (i, j), where i and j represent the addresses along respective axes. Such an array may comprise 255 storage cells in each of the i and j directions so that the boundaries are:

S1[i=0, 0≦j≦255]
S2[i=255, 0≦j≦255]
S3[0≦i≦255, j=0]
S4[0≦i≦255, j=0]

At each array element specified in terms of i and j, for example the height of the object located at the spatial point is stored. It should be noted that the capacity of the image memory 82 is dependent only on the complexity and the number of objects to be identified for robot operation and is independent of the positioning accuracy and the number of the points at which the robot observes the environment for positioning.

The arithmetic unit 83 calculates the projection of the topography (the configuration of the surrounding objects on the ground) expressed by the map, on the basis of the map stored in the main memory 82, the position of the robot, the photographing direction of the image input device 7, and the focal length of the lens used. This calculation is done for the following purpose.

The content of the main memory 82 signifies topography created on the basis of information obtained through the image input device 7 and used to update topography data previously stored and based on theoretical knowledge of the topography, and so, is not definite topography obtained by surveying the actual surroundings. Accordingly, the topography indicated by main memory 82 does not always agree with the actual one. In this sense, the map of the present invention expresses an imaginary landscape. Here, a subject for approaching the propriety of the map will be considered. At this time, when it is remembered that the actual topography cannot be directly measured and that only the image obtained through the image input device 7 is utilizable, a processing is performed on the basis of the level of the input image to correct the stored topography. More specifically, an image is obtained by correlating the topography expressed by the map of the main memory 82 to that observed through the image input device 7, whereby the propriety of the map is determined. As stated above, the arithmetic unit 83 delivers as its output the image which is forecast to arise from the imaginary landscape. In this sense, the output of the arithmetic unit 83 shall be called the "predictive image".

A process for correcting the map by the use of the predictive image will be explained below with reference to FIGS. 1 and 2.

Step 1; The data stored in the general building file 61 is transmitted to the main memory 82.

Step 2; The traveling movement of the robot 1 is started. This traveling movement of the robot 1 is controlled by the control circuit 2.

Step 3; The outputs of the encoder 11 and gyroscope 12 are integrated, and then applied to the arithmetic unit 83.

Step 4; The predictive image is prepared by the arithmetic unit 83 on the basis of the data read out of the main memory 82 and the data inputted at Step 3.

Step 5; The photographed (actual) image produced by the image input device 7 is applied to the auxiliary memory 84.

Step 6; The reverse image of the output (predictive image) of the arithmetic unit 83 is applied (added) to the auxiliary member 84.

Step 7; The difference image representing the difference between the photographed image and the predictive image is applied to the correction unit 85.

Step 8; The output of the correction unit 85 is added to the content of the main memory 82, thereby to correct the data stored in the main memory 82.

Step 9; The data of the main memory 82 is transmitted to the individual building file 62.

Step 10; Whether or not the robot is present at a stop position is discriminated. Unless it is present at a stop position, the process returns to Step 1. If it is present at a stop position, the subsequent operation is stopped.

In obtaining the predictive image at Step 4, a view along an optical path which extends from a topographical item such as a building to the image input device 7 may be calculated. The series of processing for calculating the predictive image can be performed by digital operations. To this end, the simulation of the optical path which extends from the road, building, obstacle or the like stored in the main memory 82, to the image input device 7 may be done with a computer.

Figure 4:
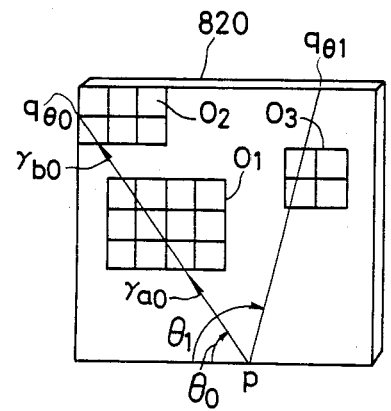
FIGS. 4 to 6 are diagrams for explaining another embodiment of the arithmetic unit in FIG. 2.
Figure 5:
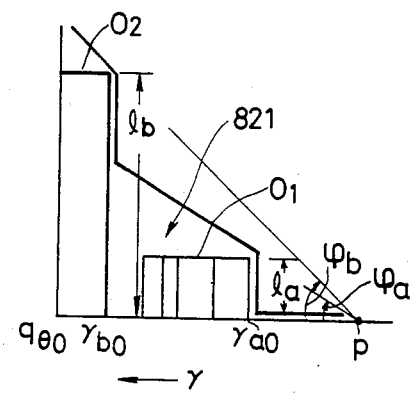
Figure 6:
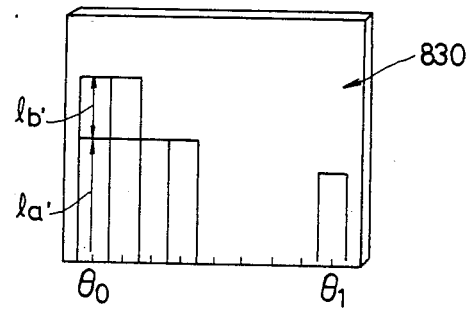

An example of the simulation is illustrated in FIGS. 4 to 6. First, it is assumed that a map of the contents indicated by numerals 820 and 821 in FIGS. 4 and 5 by way of example are stored in the main memory 82. In the figures, the symbols $O_1$, $O_2$ and $O_3$ shall indicate objects such as buildings and obstacles. It is also assumed that the image input device 7 is positioned at a point corresponding to point p on the map and is delivering an image of a landscape in a range corresponding to $\theta_0$–$\theta_1$. A predictive image 830 in FIG. 6 to be obtained on the basis of the map 820, 821 is prepared in accordance with the following algorithm, which is illustrated by the flow diagram of FIG. 3B:

[Algorithm A]

The range $\theta_0$–$\theta_1$ is divided by $N_K$ (eight in the example of FIG. 6) to determine $d\theta$ and K is set to zero. (Step A1) Thereafter, in Step 2A, i is set to ip, j is set to zero; after which $\theta$ is set to $\theta_0 + K*d\theta$, resulting in $\theta = \theta_0$. (Step 3A)

An object is retrieved successively in the direction $\theta$ from the point p. In the example of FIG. 5, the object $O_1$ is found at a distance aO from the point p. This is performed by decrementing i (Step A5) and calculating j based on the angle $\theta$(Step A6). This is followed by calculating the distance $\gamma$ along the angle $\theta$(Step A7). This is repeated until the object $O_1$ is detected by reading out a height value from memory 82.

The height $l_a$ of the object $O_1$ is read from the main memory 82. (Step A8) The magnification $\alpha(\gamma_{aO})$ of the lens in the image input device 7 is evaluated as a function of the distance $\gamma_{aO}$, and an image height $l_a'$ is calculated as follows:

$$l_a' = \alpha(\gamma_{aO}) \cdot l_a$$

A device of the height $l_a'$ is depicted at the position $\theta_0$ on the predictive image plane 830. (Step A9) Then the height angel L is updated (Step A10) based on the image height $l_a$ and the distance $\gamma$.

The retrieval continues from $\gamma_{aO}$ in the direction $\theta$. At this time, objects of height less than $(\gamma/\gamma_{aO})l_a$ for various $\gamma$'s are neglected. (Steps A9 and A10 are skipped) In the example of FIG. 4, the object $O_2$ is found at a point $\gamma = \gamma_{bO}$.

The height $l_b$ of the object $O_2$ is read from the main memory 82. (Step A8) The magnification $\alpha(\gamma_{bO})$ of the lens is evaluated as a function of the distance $\gamma_{bO}$, an image height $l_b'$ is calculated as follows:

$$l_b' = \alpha(\gamma_{b0}) \cdot \left[ l_b - l_a\left(\frac{\gamma_{b0}}{\gamma_{a0}}\right) \right]$$

A device of the height $l_b'$ is added over the device corresponding to the object $0_1$, at the position $\theta_0$ on the predictive image plane 830. (Step A9)

Until the distance reaches the boundary of the map, operations similar to (Step A3)–(Step A10) are repeated. When the boundary of the map is reached, $\theta$ is altered to the next division by incrementing K (Step A11), and the process is returned to (Step A2). Further, when $\theta = \theta_1$ holds, the operations are ended.

While, in the aforementioned [Algorithm A], the retrieval is performed successively in the direction $\theta$, such processing may well be done in parallel.

Figure 7:
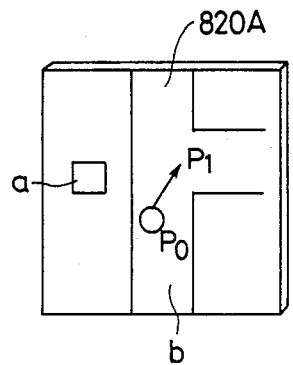
FIGS. 7 to 10 are diagrams for explaining an embodiment of a correction unit in FIG. 2.

Next, a process for correcting the map with the predictive image will be described in detail with reference to FIGS. 7 to 10. First, it will be assumed that, at an initial time $t_0$, a map as indicated by symbol 820A in FIG. 7 is stored in the main memory 82. Here it is supposed that the existence of a building a and a T-shaped road b are known surroundings at the time $t_0$ at which the motion of the robot starts. Of course, in a case where no knowledge of the surroundings is available at the time $t_0$, the stored content 820A is blank, that is, a road is assumed to extend over the whole surface. Even in this case, the process to be stated below applies quite similarly. In the map 820A shown in FIG. 7, a circle O ($P_O$) denotes the position of the robot, and an arrow indicates the traveling direction thereof.

Figure 8:
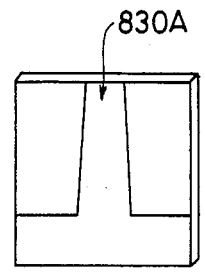
Figure 9:
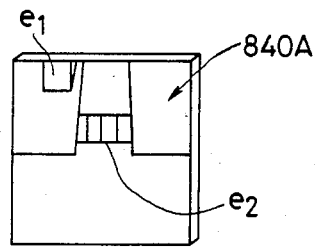
Figure 10:
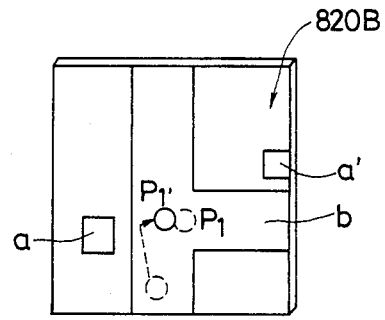

Here, it is assumed that the robot is traveling so as to be positioned at the fore end $P_1$ of the arrow at a time $t_1$ ($t_0 < t_1$) At this time, the arithmetic unit 83 carries out the computation as explained in conjunction with FIGS. 4 to 6 and delivers a predictive image as indicated by symbol 830A in FIG. 8. It is now assumed that an input image as shown in 840A in FIG. 9 is received from the image input device 7 at the time $t_1$. Herein, the following differences are detected between the predictive image 830A of FIG. 8 and the input image 840A of FIG. 9:

(i) Topographical items $e_1$ and $e_2$ appear in the input image 840A.
(ii) In the images the positions of the roads are different.
(iii) On the basis of the detected results, the correction unit 85 updates the stored content of the main memory 82 into a map 820B shown in FIG. 10. Here, a building a' is added in correspondence with $e_1$, and the position of the robot is corrected from $P_1$ into $P_1'$. Here, it is decided that the item $e_2$ is a figure depicted on the road and is omitted on the map. The decision is made on the basis of a position where the difference image $e_2$ exists, or the position of an object which is thought to produce the difference image $e_2$.

Here, the new object a' is added on the map. This is performed in conformity with the following algorithm:

[Algorithm 1]

(Step 1-1)
Among objects which might produce difference images, the largest one is placed on the map.
(Step 1-2)
In the object set anew, a part which is contradictory to a known road, building or obstacle is deleted.
(Step 1-3)
An input image is gained anew, and the algorithm is returned to Step 1-1.

[Algorithm 2]

(Step 2-1)
Among objects which might produce difference images, the smallest one is added on the map.
(Step 2-2)
An input image is gained anew, and the algorithm is returned to Step 2-1.

In the aforementioned algorithm 1, the unknown object contracts with the addition of information based on the input image. In contrast, in the algorithm 2, the unknown object expands with increase in information. In either case, it is to be understood that, as more information is stored with the traveling movement of the robot, or the like, the map converges to the true topography.

As described above, the function of the correction unit 85 for use in the present invention is realized by a computer. In this case, however, the operator's judgment may well be utilized. It is of course possible that the operator performs all the correcting operations. Especially in the latter case, the predictive image and the input image are arrayed and presented in front of the operator, whereby the computation of the difference image can be omitted.

As set forth above, according to the present invention, the efficient storage of image information becomes possible. As a result, the control of a machine which operates using the image information as inputs can be facilitated.

We claim:
1. In an apparatus which processes three dimensional topographical information on the arrangement of roads, buildings, obstacles and the like, which are not necessarily located perpendicularly to a direction of movement of an automatic traveling object, for controlling movement of an automatic traveling object, an image processing apparatus comprising: image input means mounted on the automatic traveling object for viewing a surrounding landscape and providing an output signal representing a two dimensional intensity distribution of light reflected or emitted from roads, buildings, obstacles and the like; storage means for storing three dimensional map data as to the arrangement of the roads, building, obstacles and the like in an area where the automatic traveling object is to move; predicting means connected to said storage means for predicting an output of said image input means for a given location of the automatic traveling object by producing a signal representing a predictive two dimensional intensity distribution of light reflected or emitted from roads, building, obstacles and the like on the basis of said three dimensional map data; means for comparing an output signal representing an actual two dimensional input intensity distribution of light reflected or emitted from roads, buildings, obstacles and the like from said image input means and the signal representing the predictive two dimensional intensity distribution of light reflected or emitted from roads, buildings, obstacles and the like and for obtaining a difference two dimensional intensity distribution of light reflected or emitted from roads, buildings, obstacles and the like; and correction means connected to said comparing means for updating map data in said storage means on the basis of said difference two dimensional intensity distribution of light reflected or emitted from roads, buildings, obstacles and the like.

2. An image processing apparatus as defined in claim 1, wherein said predicting means comprises a computer which simulates an optical path that extends from a road, building, obstacle and the like stored in said storage means to generate the two dimensional intensity distribution of light reflected or emitted from roads, buildings, obstacles and the like and supplies a signal representative thereof to said comparing means.

3. A method which processes three dimensional topographical information on the arrangement of roads, buildings, obstacles and the like, which are not necessarily located perpendicularly to a direction of movement of an automatic traveling object, for controlling the movement of an automatic traveling object, and which employs storage means for storing three dimensional map data and image input means mounted on the automatic traveling object for producing a signal representing a two dimensional intensity distribution of light reflected or emitted from a surrounding landscape viewed from said traveling object, comprising reading out the three dimensional map data from said storage means; predicting an output of said image input means for a location of the automatic traveling object by calculating a predictive two dimensional intensity distribution of light reflected or emitted from roads, buildings, obstacles and the like on the basis of said three dimensional map data, comparing said predictive two dimensional intensity distribution to an input represented by a signal delivered from said image input means for obtaining a two dimensional difference intensity distribution of light reflected or emitted from roads, buildings, obstacles and the like; and updating the three dimensional map data stored in said storage means on the basis of said two dimensional difference intensity distribution of light reflected or emitted from roads, buildings, obstacles and the like.

4. An image processing method as defined in claim 3, wherein at the predicting step, an object represented by map data is retrieved from an area within a viewing angle of a position corresponding to said image input means.

5. An image processing method as defined in claim 3, wherein at the predicting step, a predictive image of only that part of each image within the viewing angle of said image input means is calculated.

6. An image processing method as defined in claim 3, wherein, when a difference has been detected between an input two dimensional intensity distribution of light reflected or emitted from roads, buildings obstacles and the like and a predictive two dimensional intensity distribution of light reflected or emitted from roads, buildings, obstacles and the like at the comparing step, data relating to the largest object is renewed in said three dimensional map data in a range not contradictory to building, obstacle and the like data in the input two dimensional intensity distribution of light reflected or emitted from roads, buildings, obstacles and the like and the map three dimensional data, whereupon the three dimensional map data is compared with sequentially received input two dimensional intensity distributions of light reflected or emitted from roads, buildings, obstacles and the like so as to delete any excess part of renewed object data at the updating step.

7. An image processing method as defined in claim 3, wherein, when a difference has been detected between input two dimensional intensity distribution of light reflected or emitted from roads, buildings, obstacles and the like and the predictive two dimensional intensity distribution of light reflected or emitted from roads, buildings, obstacles and the like at the comparing step, data relating to the smallest object which causes such differences are successively added to the three dimensional map data at the updating step.

8. An image processing method as defined in claim 3, wherein at the updating step, positions where objects causing differences between input two dimensional intensity distributions of light reflected or emitted from roads, buildings, obstacles and the like and predictive two dimensional intensity distributions of light reflected or emitted from roads, buildings, obstacles and the like are classified, and only data relating to objects necessary for determining a traveling scheme of the automatic traveling object are selectively added to the three dimensional map data.

9. An image processing method as defined in claim 3, wherein at the updating step, the positions of the two dimensional difference intensity distributions of light reflected or emitted from roads, buildings, obstacles and the like between input two dimensional intensity distributions of light reflected or emitted from roads, buildings, obstacles and the like and predictive two dimensional intensity distributions of light reflected or emitted from roads, buildings, obstacles and the like are classified, and only data relating to objects necessary for determining a traveling scheme of the automatic traveling object are added to the three dimensional map data.

* * * * *